March 19, 1957 — F. SINGER — 2,785,612
PHOTOGRAPHIC SHUTTER
Filed Aug. 27, 1952
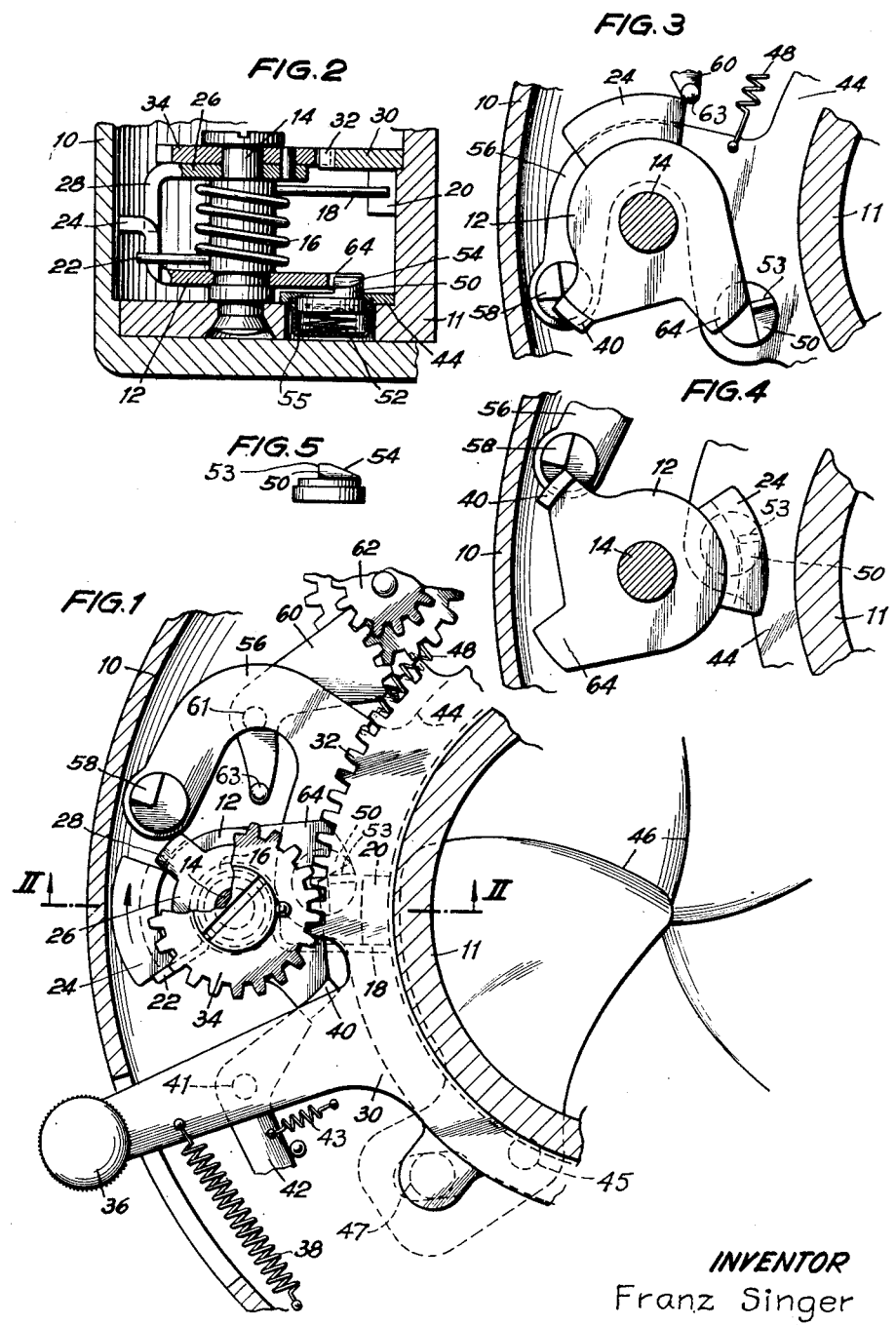
INVENTOR
Franz Singer
By Charles Shepard
Attorney

United States Patent Office 2,785,612
Patented Mar. 19, 1957

2,785,612

PHOTOGRAPHIC SHUTTER

Franz Singer, Munich, Germany, assignor to Hans Deckel, Munich-Solln, and Friedrich Wilhelm Deckel, Garatshausen, Germany Application August 27, 1952, Serial No. 306,562

Claims priority, application Germany June 20, 1952

2 Claims. (Cl. 95—63)

This invention relates to a photographic shutter, particularly a shutter of the so-called lens type or objective type, as distinguished from a shutter of the focal plane type. An object of the invention is the provision of a generally improved and more satisfactory shutter.

Another object of the invention is the provision of a shutter having a more favorable power transmission and a particularly low frictional loss in the transmission of power from the main operating member or master member of the shutter, to the blade ring which opens and closes the shutter blades or leaves, as compared with prior shutters of the same general type.

A further object of the invention is the provision of a shutter in which the main operating member or master member of the shutter is operatively connected to the blade ring at a point farther from the axis of rotation of the blade ring during the blade closing movement, than it is during the blade opening movement, so as to produce an increased leverage effect during the blade closing movement, when the main driving spring of the master member is already partially run down and therefore has less power or driving force than it has during the blade opening movement.

A still further object is the provision of a shutter in which the main driving member or master member itself engages directly with a portion of the blade ring, thus eliminating the need for intermediate levers or other intermediate transmission members, and reducing not only the expense and complexity of construction but also the frictional drag resulting from the usual intermediate levers or other intermediate members interposed between the master member and the blade ring during one or the other of the two movements of the blade ring.

These and other desirable objects may be attained in the manner disclosed as an illustrative embodiment of the invention in the following description and in the accompanying drawings forming a part hereof, in which:

Fig. 1 is a fragmentary front or face view of a shutter in accordance with the present invention, with the cover plate and various other parts removed in order to show better the underlying construction;

Fig. 2 is a radial section taken approximately on the line 2—2 of Fig. 1;

Fig. 3 is a fragmentary view of the master member and associated parts in the position assumed after the completion of a blade opening movement and just as the master member is ready to begin a blade closing movement;

Fig. 4 is a similar view of the parts at the end of the blade closing movement; and Fig. 5 is a side elevation of an axially displaceable operating pin.

The same reference numerals throughout the several views indicate the same parts.

Referring first to Figs. 1 and 2, the shutter comprises the usual annular casing or housing indicated in general by the numeral 10, the inner wall of the casing being formed by the lens tube 11 in which some or all of the camera lenses are mounted. The shutter blades are indicated in general at 46, and are of any suitable number, usually about three to five blades being employed. Each shutter blade has the usual two pivots 45 and 47, one pivot being a fulcrum pivot mounted in the shutter casing and the other pivot constituting an operative connection between the blade and the blade ring 44 which is mounted to turn first in one direction to open all of the shutter blades and then in the other direction to close them. The blade ring 44 may be mounted to turn on the lens tube 11 as a bearing, about an axis which coincides with the optical axis of the lens system. A weak spring 48 tends to hold the blade ring at the clockwise limit of its motion, in which position the blades are closed.

The main drive member or master member of the shutter, in accordance with the present invention, is the member 12, rotatable on the pin 14 which is fixed in the shutter housing. A coil drive spring 16 surrounds the pin 14, and has one end 18 engaging a stationary lug or stop member 20 in the casing, while the other end 22 of the spring presses against a lug 24 of the master member 12, constantly tending to turn the master member in the clockwise direction of the arrow in Fig. 1.

In order to tension the spring 16 to make the shutter ready for an exposure operation, there is a rotary plate 26 also mounted to turn on the pivot pin 14 and having a lug 28 which may be brought into engagement with the lug 24 on the master member 12. A tensioning ring or setting ring 30 is mounted to turn on the lens tube 11 as a bearing, and is provided on part of its periphery with gear teeth 32 meshing with gear teeth on a small gear disk 34 fixed to or otherwise suitably coupled to the rotary disk 26. An arm 36 on the tensioning ring 30 extends radially outwardly through a slot in the outer wall of the shutter casing to an accessible external handle by which the tensioning ring may be manually moved to tension the shutter. A light spring 38 tends to hold the tensioning ring in the extreme counterclockwise limit of its motion.

When it is desired to set or tension the shutter ready for an exposure, the accessible end of the arm 36 is moved in a clockwise direction, upwardly when viewed as in Fig. 1, against the light force of the spring 38. This clockwise movement of the tensioning ring 30 will, through the gear teeth 32, cause counterclockwise movement of the gear 34 and the setting disk 26, so that the lug 28 on the latter will engage the portion 24 of the master member 12 and swing the entire master member in a counterclockwise direction on its pivot 14 until a projection 40 on the master member is caught by the end of a latching pawl 42 pivoted at 41 in the shutter case and constantly urged by a spring 43 into latching position. When it is desired to operate the shutter to make an exposure, the latching pawl 42 is moved out of engagement with the portion 40 of the master member, so that the spring 16 may drive the master member 12 in a clockwise direction. This release movement of the latching pawl may be accomplished by direct manual pressure on a part of the latching pawl which extends outside of the shutter casing to an accessible position, in the usual manner, or by an interconnecting linkage going from the latch 42 to a so-called body release member, on the body of the camera on which the shutter is mounted.

The blade ring 44 carries, on its main or annular part, a necked-down operating pin 50 which is not held fast axially in the blade ring but which can be moved in a direction axially of the pin (parallel to the optical axis of the shutter) and which is thrust forwardly by a spring 52 (Fig. 2). This pin 50 has an abrupt shoulder 53, as best seen in Fig. 5, for driving engagement with a portion of the master member when the master member is operated in one direction, and has an inclined or oblique surface 54 leading downwardly from the top of the shoulder 53, so that when the master member is moved in the opposite direction (during a setting operation) it may engage with the oblique surface 54 and depress the pin 50 against the force of the spring 52, thus passing over the pin. The spring 52 is conveniently received in a small cup 55 fixed to the bottom surface of the blade ring 44, as seen in Fig. 2, this cup serving also as a guide for the axial movements of the pin 50. The shoulder 53 may be called a pressure shoulder or contact surface, since it is the surface with which the master member engages and against which the master member presses during the opening movement of the blades.

The blade ring 44 also has an arm 56 rigidly attached to or preferably formed integrally with the main annular part of the blade ring, which arm 56 extends radially outwardly for a distance to a position near the outer wall of the shutter casing, and then extends a short distance circumferentially, and carries at the end of its circumferential portion a fixed pin 58. The movable pin 50 and the fixed pin 58 constitute operating pins which cooperate directly with the main driving member or master member 12 to produce the opening and closing movements of the blade ring.

For the purpose of timing the shutter to make exposures of different lengths, there is provided a timing mechanism of the well known gear train type, including a gear sector 60 mounted on a fixed pivot 61 in the casing, and provided with gear teeth which mesh with the teeth of the retarding gear 62, the gear train being continued through as many gear elements as desired, and terminating usually in a star wheel and escapement anchor of the kind commonly used in gear trains for photographic shutters. A pin 63 on the gear segment 60 lies in position to be engaged by the lug 24 on the master member 12, to retard the movement of the master member to any desired extent (depending upon the usual adjustment or setting of the gear train mechanism) during the running down movement of the master member.

As already indicated, the coupling of the master member 12 to the blade ring 44 is a direct coupling without any intermediate levers or pawls or moving parts, thus assuring maximum reliability with minimum frictional losses. In order to accomplish this direct coupling, the master member 12 is provided with a short radial arm 64. In the tensioned position of the master member, ready for making an exposure, this arm 64 lies close to the contact shoulder 53 of the pin 50 on the blade ring 44, as seen in Fig. 1. When the latch 42 is released and the spring 16 is allowed to drive the master member 12 in a clockwise direction, the approximately radial forward edge of the arm 64 comes into contact with the shoulder 53 on the pin 50 and moves this pin in a direction downwardly when viewed as in Fig. 1, thereby moving the blade ring 44 in a counterclockwise direction against the force of the light spring 48, and opening the shutter blades 46.

When the blade ring reaches the fully opened position, the forward corner of the arm 64 simultaneously reaches the pressure contact shoulder 53 of the pin 50, and the curved end of the arm 64 engages the pin 50 and holds the blade ring in fully open position so long as the curved end of the arm 64 is against the pin. This end of the arm 64 is curved concentric with the pin 14 on which the master member turns, so that while the end of the arm 64 engages the pin 50 no further movement of the pin 50 or the blade ring 44 is caused, but the arm simply holds the blade ring in fully open position. At about the time that the forward corner of the arm 64 reaches the pin 50, the forward radial edge of the lug 24 on the master member engages the pin 63 of the retarding mechanism, so that the retarding mechanism is effective on the master member during that part of the turning of the master member in which the arcuate end of the arm 64 engages the pin 50.

Substantially at the same time that the pin 63 of the retarding mechanism leaves the radial surface and begins to engage the circumferential surface of the lug 24, the circumferential or arcuate end of the arm 64 leaves the pin 50, and at this same time the lug 40 on the master member comes into contact with the second pin 58 on the blade ring, this position of the parts being shown in Fig. 3. During the remainder of the clockwise movement or running down movement of the master member 12, the master member has no further effect on the pin 50, and the retarding pin 63 has no further effect on the master member, but the lug 40 on the master member presses against the pin 58 and moves this pin in an upward direction when viewed as in Figs. 3 and 4, from the position shown in Fig. 3 (where the shutter blades are still fully open) to the position shown in Fig. 4 (where the shutter blades are again fully closed and the shutter is in its completely run-down or rest position).

During the running down movement of the master member, the main driving spring 16 is, of course, being unwound more and more, so that it becomes progressively weaker during the running down movement. It is noted, however, that the radial distance from the optical axis of the shutter (which is the center of rotation of the blade ring 44) to the driving pin 58, is considerably greater than the radial distance to the driving pin 50. Therefore, the leverage effect produced on the blade ring during the closing movement is greater than during the opening movement of the shutter. So even though the spring 16 is weaker during the closing movement than it is during the opening movement, the force acting to close the shutter blades is approximately equal to the force acting to open them, and a quick closing movement is assured, thus increasing the efficiency of the shutter.

From the rest position or run-down position shown in Fig. 4, the master member is moved back to the set or tensioned position of Fig. 1 by operating the tensioning arm 36 as previously mentioned. The operation of this tensioning arm 36 swings the gear 34 and the member 26 around so that the lug 28 on the latter engages the lug 24 on the master member 12, and swings the master member in a counterclockwise direction on its pivot pin 14, during which counterclockwise movement the arm 64 on the master member engages the inclined or oblique edge 54 of the driving pin 50 and depresses this pin (against the spring 52) into the cup 55 so that the arm of the master member can travel past the pin. When the arm 64 moves past the pin, the spring 52 again pushes the pin 50 up so that the contact shoulder 53 thereof is in the plane of the arm 64 and is ready to be engaged and driven by the next clockwise movement of the arm 64. Just after the arm 64 moves beyond the pin 50, the latch 42 engages the lug 40 and holds the master member in its set or tensioned position. The same lug 40 on the master member serves both for engagement with the latch 42, and for engagement with the driving pin 58 during the closing movement of the shutter.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a casing having an optical axis, a plurality of shutter blades movable with respect to said optical axis successively to admit and to obstruct passage of light along said optical axis, an oscillatory blade ring having a generally annular part operatively connected to said blades to open them upon turning movement of said blade ring in one direction and to close said blades upon turning movement of said ring in the opposite direction, both movements being substantially about said optical axis as an axis of oscillation, a spring tending to turn said ring in said opposite direction, a master member mounted in said casing for rotation about an axis substantially offset laterally from said optical axis, an opening abutment pin mounted on said blade ring at a radial distance from said optical axis less than the distance from said optical axis to said axis of rotation of said master member, said blade ring including a portion extending from the generally annular part thereof approximately radially outwardly and thence circumferentially in the vicinity of said master member and spaced outwardly from said annular part, a closing abutment pin mounted on said circumferentially extending portion of said blade ring and at a materially greater radial distance from said optical axis than said opening abutment pin, said axis of rotation of said master member lying between said annular part and said circumferentially extending portion of said blade ring when said blades are in open position, said master member including an opening arm portion having an approximately radially extending edge for engaging said opening abutment pin during one part of rotation of said master member, to displace said blade ring against the force of said spring to open said blades, said master member also including a closing arm portion having an approximately radially extending edge angularly displaced from said opening arm edge for engaging said closing abutment pin during another part of rotation of said master member, to drive said blade ring in a blade closing direction.

2. A construction as defined in claim 1, in which said opening abutment pin is mounted on said blade ring for movement relative thereto in a direction axially of said pin and parallel to said optical axis, and further including a cup member mounted on and carried by said blade ring in axial alinement with said opening abutment pin, said cup member having an open mouth and a substantially closed bottom, said opening abutment pin having a base end within said open mouth, and a coiled compression spring in said cup member interposed between said bottom of said cup member and said base end of said pin and tending to move said pin axially out of said cup member.

References Cited in the file of this patent

UNITED STATES PATENTS

| | | |
|---|---|---|
| 975,464 | Schmid et al. | Nov. 15, 1910 |
| 2,316,020 | Riddell | Apr. 6, 1943 |
| 2,382,623 | Fuerst | Aug. 14, 1945 |
| 2,410,649 | Fuerst | Nov. 5, 1946 |